(12) United States Patent
Perry et al.

(10) Patent No.: US 7,615,518 B2
(45) Date of Patent: Nov. 10, 2009

(54) COMPOSITION FOR DENATURING AND BREAKING DOWN FRICTION-REDUCING POLYMER AND FOR DESTROYING OTHER OIL WELL CONTAMINANTS

(76) Inventors: Stephen C. Perry, 90 Kerry Pl., Suite 2, Norwood, MA (US) 02062; Michael E. Williams, P.O. Box 1832, Chickasha, OK (US) 73023

(*) Notice: Subject to any disclaimer, the term of this patent is extended or adjusted under 35 U.S.C. 154(b) by 396 days.

(21) Appl. No.: 11/426,377

(22) Filed: Jun. 26, 2006

(65) Prior Publication Data

US 2007/0298979 A1 Dec. 27, 2007

(51) Int. Cl.
*C09K 8/74* (2006.01)
*E21B 43/27* (2006.01)
*E21B 43/26* (2006.01)
*E09K 3/00* (2006.01)

(52) U.S. Cl. .................. 507/269; 166/270; 166/274; 166/300; 166/305.1; 166/273; 252/182.13; 252/8.551; 252/8.552; 252/8.553

(58) Field of Classification Search .................. 507/269
See application file for complete search history.

(56) References Cited

U.S. PATENT DOCUMENTS

| 4,871,022 A | | 10/1989 | McGlathery |
| 4,945,992 A | | 8/1990 | Sacco |
| 4,964,466 A | * | 10/1990 | Williams et al. ............. 166/300 |
| 5,031,700 A | | 7/1991 | McDougall et al. |

* cited by examiner

*Primary Examiner*—Timothy J Kugel
*Assistant Examiner*—Atnaf Admasu
(74) *Attorney, Agent, or Firm*—Malin Haley DiMaggio Bowen & Lhota, P.A.

(57) ABSTRACT

A composition and method for breaking down and denaturing friction-reducing compound introduced into the ground during the drilling of oil wells and for destroying other contaminants and biohazards naturally present within and artificially introduced into oil wells, which are formed as a result of the drilling and pumping processes. The composition comprises several species of oxidizing agent compounds that are effective in breaking down hydrogen sulfide produced by bacteria as well as the friction-reducing polymer used during drilling and several other organic compounds.

11 Claims, No Drawings

COMPOSITION FOR DENATURING AND BREAKING DOWN FRICTION-REDUCING POLYMER AND FOR DESTROYING OTHER OIL WELL CONTAMINANTS

BACKGROUND OF THE INVENTION

1. Field of the Invention

This invention relates to a composition and method for denaturing and breaking down friction-reducing polymer introduced into oil wells and for destroying other contaminants that are naturally present in and artificially supplied to oil wells as part of the oil drilling and pumping process.

2. Description of Related Art

Hydraulic fracturing is commonly used in oil well drilling applications. A typical conventional slick water fracturing protocol involves several hydraulic pumps that force a predetermined amount of water or more down-hole feed at a calculated rate and at a high pressure. The pressure of the water forced down-hole fractures the underground or subterranean rock formations thereby permitting gas and oil to flow freely into the well. Numerous chemicals are added on the fly as the water is forced into the well including but not limited to scale inhibitors, biocides, shale inhibitors, oxygen scavengers, friction-reducing agents, and flow-back additives. Friction-reducing agents are useful for decreasing the friction caused by the large volumes of water flowing through the hydraulic pumps. Friction-reducing agents also reduce the pressure placed upon the hydraulic pumps. Flow-back additives, such as the present inventive composition, assist friction-reducing agents at the beginning of a fracturing job by decreasing friction and also assist in breaking down or dissolving the friction-reducing agent after the fracturing job is completed.

Fracturing chemicals, fracturing sand, and water are pumped down-hole into a well under high pressure to fracture the subterranean formation during a fracturing job. The fractures in the subterranean formation created by the fracturing fluid and water under pressure are held open by the fracturing sand. Once this fracturing process is complete, oil and gas flow into the wellbore through the fractures and the flowback of the friction-reducing polymer begins. The pressure of the subterranean formation pushes the fracturing fluid out of the well into tanks above ground. Depending upon the depth of the well and the amount of fracturing fluid used, the flowback can continue for a period lasting from several days to approximately one month. When the flowback ends, most of the fracturing fluid including the friction-reducing polymer has been removed and the oil well is ready for production.

U.S. Pat. No. 5,031,700, issued to McDougall et al., on Jul. 16, 1991, describes a method of improving the permeability of subterranean formations, and particularly the permeability of sandstone formations containing clays and silicates, using chlorine dioxide. The '700 patent does not describe the use of an oxy-chloro compound for denaturing and breaking down or decomposing friction-reducing polymer and other toxic chemical and biological agents and organisms.

U.S. Pat. No. 4,945,992, issued to Sacco on Aug. 7, 1990, describes a process for producing as well as for cleaning high pressure water injection wells and oil-producing wells. The '992 patent does not describe the use of an oxy-chloro compound for denaturing and breaking down or decomposing friction-reducing polymer in an oil well.

U.S. Pat. No. 4,871,022, issued to McGlathery on Oct. 3, 1989, describes a method for removing polymer plugging material from injection and oil-producing wells. The '022 patent does not describe the use of an oxy-chloro compound for denaturing and breaking down or decomposing friction-reducing polymer in an oil well, but describes a method for removing polymeric material from the well that was added in the form of an aqueous flooding medium to dislodge oil present in formation solids. Once dislodging the oil from these formations, the aqueous polymeric flooding medium of the '022 patent forces the oil toward a primary well bore for recovery. However, over time, the polymeric medium forms a polymer plug by leaving solid polymeric deposits on the walls of the well bore and interstices of the perforated zone of the formation.

U.S. Pat. No. 4,964,466, issued to Williams et al., on Oct. 23, 1990, describes a method of fracturing a subterranean formation using hydraulic fracturing with chlorine dioxide for cleanup. The '466 patent does not describe the use of an oxy-chloro compound for denaturing and breaking down or decomposing friction-reducing polymer, scale inhibitors, biocides, shale inhibitors, oxygen scavengers, friction-reducing agents, and flow-back additives in an oil well. Moreover, the present invention effectively uses oxy-chloro compounds at much lower levels (for example, 0.40 to 10.0 ppm (parts per million)) than the '466 invention.

SUMMARY OF THE INVENTION

The novel denaturing composition comprises an oxidizing agent compound that is added to the fracture fluid being pumped into an oil well during drilling by hydraulic fracturing. The oxidizing agent compound comprises one or more oxy-chloro compounds, one or more earth metal alkali oxidizing compounds, or a mixture of one or more of each. The denaturing composition is added to the fracture fluid simultaneously with a friction reduction polymer. This "on-the-fly" addition of the denaturing composition concurrently with the pumping of the friction-reducing polymer into the oil well as part of a fracturing fluid provides two beneficial effects to the oil well drilling process. First, the denaturing composition immediately begins to degrade or denature the friction-reducing polymer, thereby unwinding said polymer, which quickens the onset of the friction-reducing properties of the friction-reducing polymer. Secondly, the denaturing composition increases the hydrogen-bonding potential between the friction-reducing polymer and water, thus, unwinding the polymer at a more rapid rate.

The denaturing composition unwinds the friction-reducing polymer more quickly by increasing the water solubility of the polymer. This increased solubility is due to the hydrogen-bonding that occurs between the oxygen atoms in the oxidizing agent and the hydrogen atoms in the friction-reducing polymer. The weak attractive forces of hydrogen-bonding existing between the polymer and water slightly restrict the denaturing or unwinding of said friction-reducing polymer. However, when added to the fracturing fluid during hydraulic fracturing, the oxidizing agent aids the friction-reducing polymer in overcoming or reducing the effects of the weak attractive forces between the hydrogen atoms of one water molecule to the oxygen atoms of other water molecules so that said polymer can unwind, thereby permitting the characteristic friction-reducing effects of the polymer to occur.

The addition of the denaturing composition increases the water solubility of the friction-reducing polymer when added on the fly during a hydraulic fracturing oil well drilling job. This increased water solubility is also beneficial for aiding in the clean-up of hoses and other equipment after completion of a fracturing job. Over time, the oxidizing agent that remains in the oil well after flow-back decomposes the friction-reducing polymer remaining downhole in the oil well.

An object of this invention is to provide a composition and method for denaturing a friction-reducing polymer so that the solubility of said polymer in water is increased.

Another object of the invention is to provide a composition and method that, over time, will break down friction-reducing polymer remaining downhole after a hydraulic fracturing job.

Yet another object of the invention is to quicken the onset and increase the effects of the friction reducing properties of the friction-reducing polymer by introduction of the oxidizing agent into the oil well during a fracturing job along with the fracturing fluid.

Still another object of the invention is to use the oxidizing agent to break down and destroy explosive and corrosive hydrogen sulfide gas as well as the bacteria that produce the gas.

In accordance with these and other objects which will become apparent hereinafter, the instant invention will now be described with particular reference to the accompanying drawings.

DETAILED DESCRIPTION

The terminology employed herein is used for the purpose of describing particular embodiments only and is not intended to be limiting since the scope of the present invention will be limited only by the appended claims and equivalents thereof. The references discussed herein are provided solely for their disclosure prior to the filing date of the present application. Nothing herein is to be construed as an admission that the inventors are not entitled to antedate such disclosure by virtue of prior invention.

It must be noted that, as used in this specification and the appended claims, the singular forms "a," "an," and "the" include plural referents unless the context clearly dictates otherwise. Thus, for example, reference to "a fracturing fluid" includes reference to one or more of such fracturing fluids, and reference to "a friction-reducing polymer" includes reference to two or more of such polymers.

The novel denaturing composition comprises an oxidizing agent that is added to the fracture fluid being pumped into an oil well during drilling by hydraulic fracturing. The oxidizing agent compound comprises one or more oxy-chloro compounds, one or more earth metal alkali oxidizing compounds, or a mixture of one or more of each. The denaturing composition is added to the fracture fluid simultaneously with a friction reduction polymer. The friction-reducing polymer comprises a polyacrylic polymer that is preferably a polyacrylate and most preferably a polyacrylamide polymer with a surfactant package in a hydrocarbon fluid base. Preferably, the hydrocarbon fluid base is a distillate or kerosene base. This "on-the-fly" addition of the denaturing composition concurrently with the pumping of the friction-reducing polymer into the oil well provides two beneficial effects to the oil well drilling process. First, the denaturing composition immediately begins to degrade or denature the friction-reducing polymer, thereby unwinding said polymer, which quickens the onset of the friction-reducing properties of the friction-reducing polymer. Secondly, the denaturing composition increases the hydrogen-bonding potential between the friction-reducing polymer and water, thus, unwinding the polymer at a more rapid rate.

The oxidizing agent comprises chlorine dioxide, sodium N-chloro-para-toluenesulfonamide, potassium peroxymonosulfate, or N2, N4, N6-trichloro-2,4,6-triamino-s-triazine. Said oxidizing agent may also be comprised of an aqueous mixture of one or more of the following: chlorine dioxide, sodium N-chloro-para-toluenesulfonamide, potassium peiroxymonosulfate, N2,N4,N6-trichloro-2,4,6-triamino-s-triazine, or any other oxidizing agent suitable for denaturing friction-reducing polymer. Chlorine dioxide is the preferred oxidizing agent used in this invention.

The earth metal alkali oxidizing compound comprises earth metal alkali borates, carbonates, chlorates, chlorites, dichromates, hypochlorites, nitrates, nitrites, perborates, percarbonates, perchlorates, permanganates, peroxides, persulfates, and any other earth metal alkali oxidizing compound suitable for denaturing friction-reducing polymer. The earth metal alkali oxidizing compound may also be comprised of an aqueous mixture of one or more of the immediately preceding compounds.

Some specific oxidizers useful for breaking down friction-reducing polymer include barium peroxide, calcium chromate, calcium hypochlorite, calcium peroxide, chlorine, chlorine dioxide, chromic acid, cobalt, cyanogens, lithium perchlorate, manganese dioxide, potassium bromate, potassium dichromate, potassium monopersulfate, potassium perchlcrate, potassium periodate, potassium persulfate, selenium dioxide, silver acetate, sodium chlorate, sodium chlorite, sodium nitrate, sodium m-periodate, and urea peroxide. Other suitable oxy-chloro compounds and earth metal alkali oxidizing compounds may also be used. Chlorine dioxide is the most preferred oxidizing agent, while use of the oxy-chloro compounds is preferred over the earth metal alkali oxidizing compounds.

The denaturing composition unwinds the friction-reducing polymer by means of hydrogen-bonding that occurs between the oxygen atoms in the oxidizing agent and the hydrogen atoms in the friction-reducing polymer. Hydrogen-bonding is one factor in producing the surface tension of water. When only water is added to the fracturing fluid containing the friction-reducing polymer, the oxygen atoms of the water molecules and the hydrogen atoms of the friction-reducing polymer chain are weakly attracted to one another. The hydrogen atoms of the water molecules are attracted also to the oxygen atoms of other water molecules. These weak attractive forces slightly restrict the denaturing or unwinding of said friction-reducing polymer. However, when added to the fracturing fluid during hydraulic fracturing, the oxidizing agent comprising the denaturing composition aids the friction-reducing polymer in overcoming or reducing the effects of the weak attractive forces between the hydrogen atoms of one water molecule to the oxygen atoms of other water molecules so that said polymer can unwind, thereby permitting the characteristic friction-reducing effects of the polymer to occur.

The addition of the denaturing composition increases the water solubility of the friction-reducing polymer when added on the fly during a hydraulic fracturing oil well drilling job. This increased water solubility is also beneficial for aiding in the clean-up of hoses and other equipment after completion of a fracturing job. The oxidizing agent in the denaturing composition breaks down the weak attractive forces present in the friction-reducing polymer, thereby allowing said polymer to unwind. In this way, the friction-reducing polymer also solubilizes more rapidly in water than if water were the only additive used in the hydraulic fracturing process. Thus, the increased water solubility of friction-reducing polymer caused by the oxidizing agent aids in recovering said polymer in the flow-back from the hydraulic fracturing process to reduce polymeric skin damage in the subterranean formation. Over time, the oxidizing agent that remains in the oil well after flow-back decomposes the friction-reducing polymer remaining downhole in the oil well.

The oxidizing agent of the denaturing composition is present in the aqueous solution at range of 0.40 to 10.0 parts per million (ppm) per 1,000 gallons of fracture fluid introduced into the oil well. The amount of oxidizing agent present in the aqueous solution is 0.2 to 0.5 gallons per 1,000 gallons of fracture fluid introduced into the oil well. The oxidizing agent and fracturing fluid preferably are introduced downhole into the oil well under pressure during the fracturing process.

The oxidizing agent of the present composition and method is also effective for breaking down or destroying other contaminants and biohazards present within oil wells, which are formed as a result of the drilling and pumping processes, such as hydrogen sulfide gas produced by sulfur-reducing bacteria as well as other toxic chemical compounds that may be used during, the drilling process. These other toxic compounds may include scale inhibitors, biocides, shale inhibitors, oxygen scavengers, friction-reducing agents, and flow-back additives. Corrosion to metal drilling and pumping equipment is reduced or eliminated by destroying hydrogen sulfide-producing bacteria present in the oil well.

The composition is used during fracturing jobs performed to drill oil wells where minimal oil well skin damage and maximum recovery of polymer are desired. The composition serves three purposes in oil well drilling applications. First, the composition initially aids the friction-reducing polymer by increasing the rate at which the friction-reducing polymer reaches maximum viscosity, and therefore, maximum friction reduction. As previously described, the composition also increases the water solubility of the friction-reducing polymer by degrading the polyacrylamide polymer chain comprising said friction-reducing polymer. Degradation of the friction-reducing polymer increases the amount of said polymer recovered in the flowback from the well. Finally, the composition reduces the amount of skin damage in the subterranean formation of the well. This last purpose of the composition is accomplished by the ability of said composition to decrease the amount of friction-reducing polymer in the formation by recovering more of said polymer in the flowback and also by continually breaking down and degrading any friction-reducing polymer that remains down-hole. The composition is also useful for cleaning hoses and other equipment contaminated by friction-reducing polymer during the fracturing job.

The instant invention has been shown and described herein in what is considered to be the most practical and preferred embodiment. The applicant recognizes, however, that departures may be made therefrom within the scope of the invention and that obvious modifications will occur to a person skilled in the art.

What is claimed is:

1. A method for denaturing and breaking down a friction-reducing polymer introduced into oil wells during the drilling and pumping process, said method comprising the following steps:
   adding to a fracture fluid an oxidizing agent, one of the following:
      an oxy-chloro compound; and
      an earth metal alkali oxidizing compound;
      wherein said fracture fluid contains a friction-reducing polymer as one ingredient; and
   introducing the fracture fluid and oxidizing agent concurrently and simultaneously downhole into an oil well during a hydraulic fracturing process used to extract oil from subterranean formations;
      wherein the oxidizing agent initially denatures or unwinds the polymer.

2. The method of claim 1, wherein the oxidizing agent is selected from one or more of the following:
   chlorine dioxide;
   sodium N-chloro-para-toluenesulfonamide;
   potassium peroxymonosulfate; and
   N2, N4, N6-trichloro-2,4,6-triamino-s-triazine.

3. The method of claim 1, wherein the earth metal alkali oxidizing compound is selected from one or more of the following:
   earth metal alkali borates;
   earth metal alkali carbonates;
   earth metal alkali chlorates;
   earth metal alkali chlorites;
   earth metal alkali dichromates;
   earth metal alkali hypochlorites;
   earth metal alkali nitrates;
   earth metal alkali nitrites;
   earth metal alkali perborates;
   earth metal alkali percarbonates;
   earth metal alkali perchlorates;
   earth metal alkali permanganates;
   earth metal alkali peroxides;
   earth metal alkali persulfates; and
   any other earth metal alkali oxidizing compound suitable for denaturing friction-reducing polymer.

4. The method of claim 1, wherein the oxidizing agent increases the water solubility of the friction-reducing polymer.

5. The method of claim 4, wherein the increased water solubility of the friction-reducing polymer allows said polymer to be recaptured during flow-back from the hydraulic fracturing process inside the oil well.

6. The method of claim 5, wherein friction-reducing polymer that remains in the oil well after flow-back is decomposed over time by the remaining oxidizing agent.

7. The method of claim 1, wherein the friction-reducing polymer that is broken down by said composition is a polyacrylic polymer with a surfactant package in a hydrocarbon fluid base;
   wherein said polyacrylic polymer is a polyacrylamide polymer; and
   wherein the hydrocarbon fluid base is a distillate or kerosene base.

8. The method of claim 1, wherein the range of oxidizing agent present in the aqueous solution is 0.40 to 10.0 parts per million (ppm) per 1,000 gallons of fracture fluid introduced into the oil well.

9. The method of claim 1, wherein the amount of oxidizing agent present in the aqueous solution is 0.2 to 0.5 gallons per 1,000 gallons of fracture fluid introduced into the oil well.

10. The method of claim 1, wherein said method is effective for breaking down or destroying other organic compounds and biohazards present within oil wells, which are formed as a result of the introduction of contaminants during the drilling and pumping processes, including but not limited to hydrogen sulfide produced by bacteria as well as other toxic chemical compounds that may be used during the drilling process including but not limited to scale inhibitors, biocides, shale inhibitors, oxygen scavengers, friction-reducing agents, and flow-back additives.

11. The method of claim 1, wherein the oxidizing agent and fracturing fluid are introduced simultaneously and concurrently into the oil well under pressure during the fracturing process.

* * * * *